US000001390H

United States Statutory Invention Registration [19]

[11] Reg. Number: H1390

Campagnuolo et al.

[43] Published: Jan. 3, 1995

[54] CLAYMORE TRAINING DEVICE

[75] Inventors: Carl J. Campagnuolo, Potomac; Donald Gross, Joppa, both of Md.

[73] Assignee: The United States of America as represented by the Secretary of the Army, Washington, D.C.

[21] Appl. No.: 2,367

[22] Filed: Jan. 6, 1993

[51] Int. Cl.[6] ..... F41A 33/00

[52] U.S. Cl. ..... 434/11; 102/401

[58] Field of Search ..... 434/11, 16, 14; 102/210, 261, 429, 400–404; 181/187; 381/155, 156; 340/384 R, 385, 386, 388, 384 E, 391

[56] References Cited

U.S. PATENT DOCUMENTS

| | | | |
|---|---|---|---|
| 4,071,112 | 1/1978 | Keele, Jr. | 181/187 |
| 5,199,874 | 4/1993 | Campagnuolo et al. | 434/11 |
| 5,246,372 | 9/1993 | Campagnuolo et al. | 434/11 |

FOREIGN PATENT DOCUMENTS

| | | | |
|---|---|---|---|
| 2166527 | 5/1986 | United Kingdom | 434/16 |

OTHER PUBLICATIONS

"MILES: The Ultimate in Training", Loral Electro-Optical Systems, p. 20, Oct. 1986.

*Primary Examiner*—Bernarr E. Gregory

*Attorney, Agent, or Firm*—Freda L. Krosnick; Frank J. Dynda; Muzio B. Roberto

[57] ABSTRACT

A training device substantially identical in size and shape to the Claymore antipersonnel mine that cooperates with the existing MILES (Multiple Integrated Laser Engagement Set) system. The training device includes a directional acoustic signal that approximates the effectiveness range of the actual Claymore mine.

5 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLAYMORE TRAINING DEVICE

RIGHTS OF THE GOVERNMENT

The invention described herein may be manufactured, used and licensed by or for the U.S. Government for Governmental purposes without payment to us of any royalty thereon.

BACKGROUND OF THE INVENTION

1. Field of the Invention

The present invention is in the field of MILES compatible inert training devices. These devices do not contain any explosives.

2. Background Art

This invention is used in systems that train soldiers for combat. The system that this invention is used in conjunction with is called the "Multiple Integrated Laser Engagement System" or (MILES). The means of interaction of the present invention with the MILES system is described in the patent application of Campagnuolo and Gerber, Ser. No. 07/691,603, now U.S Pat. No. 5,199,874.

The present existing MILES system contains a feature which is intended to sense the removal and replacement of batteries used to power the MILES equipment carried by the soldier. Circuitry in the MILES harness senses an acoustic signal generated by the MILES compatible Claymore training device (MCCTD) causing an alarm in the MILES system to activate indicating that a hit has taken place.

This invention was developed to satisfy a need for an inert safe training device that could be used to train soldiers in the use of the actual Claymore mine. The Claymore mine is a directional mine that propels lethal pellets a distance of about 50 meters within an angle of about 60 degrees. The mine is detonated by an M57 Electrical firing device which is a hand held electrical pulse generator. When a handle on the M57 hand held generator is depressed, an electrical pulse is generated which fires a blasting cap connected into the mine through a 33 meter electrical cable. The presently existing Claymore mine training devices utilize a blasting cap in combination with an inert main charge. A need exists for a non-explosive training device that the present invention fullfills.

The MILES compatible Claymore training device (MCCTD) which is the subject of this invention functions with the MILES system by flashing a light or lights when activated and radiating a directional acoustic signal which is received by the MILES system worn by the soldier.

Accordingly, it is an object of this invention to provide an inert, safe, non-explosive, and reusable MILES compatible Claymore training device (MCCTD) which is compatible with the MILES system worn by soldiers during training exercises.

It is another object of this invention to provide a (MCCTD) that radiates a directional acoustical signal.

It is another object of this invention to provide a (MCCTD) that functions with the M57 type electrical pulse generator.

It is another object of this invention to provide a (MCCTD) that cooperates with the MILES system by producing an acoustical signal that activates the MILES alarm within the directional radiation pattern of the MCCTD.

SUMMARY

This invention is a reusable, inert, non-explosive, MILES compatible CLAYMORE training device (MCCTD) which radiates a directional acoustic signal and flashes light upon activation. The directional radiation pattern is the same as the directional projectile pattern that the actual Claymore mine radiates upon detonation. The MCCTD is used instead of the actual CLAYMORE mine in training situations.

BRIEF DESCRIPTION OF THE DRAWING

A better understanding of the invention will be obtained when the following detailed description of the invention is considered in connection with the accompanying drawing(s) in which.

DETAILED DESCRIPTION OF THE INVENTION

Figure 1:
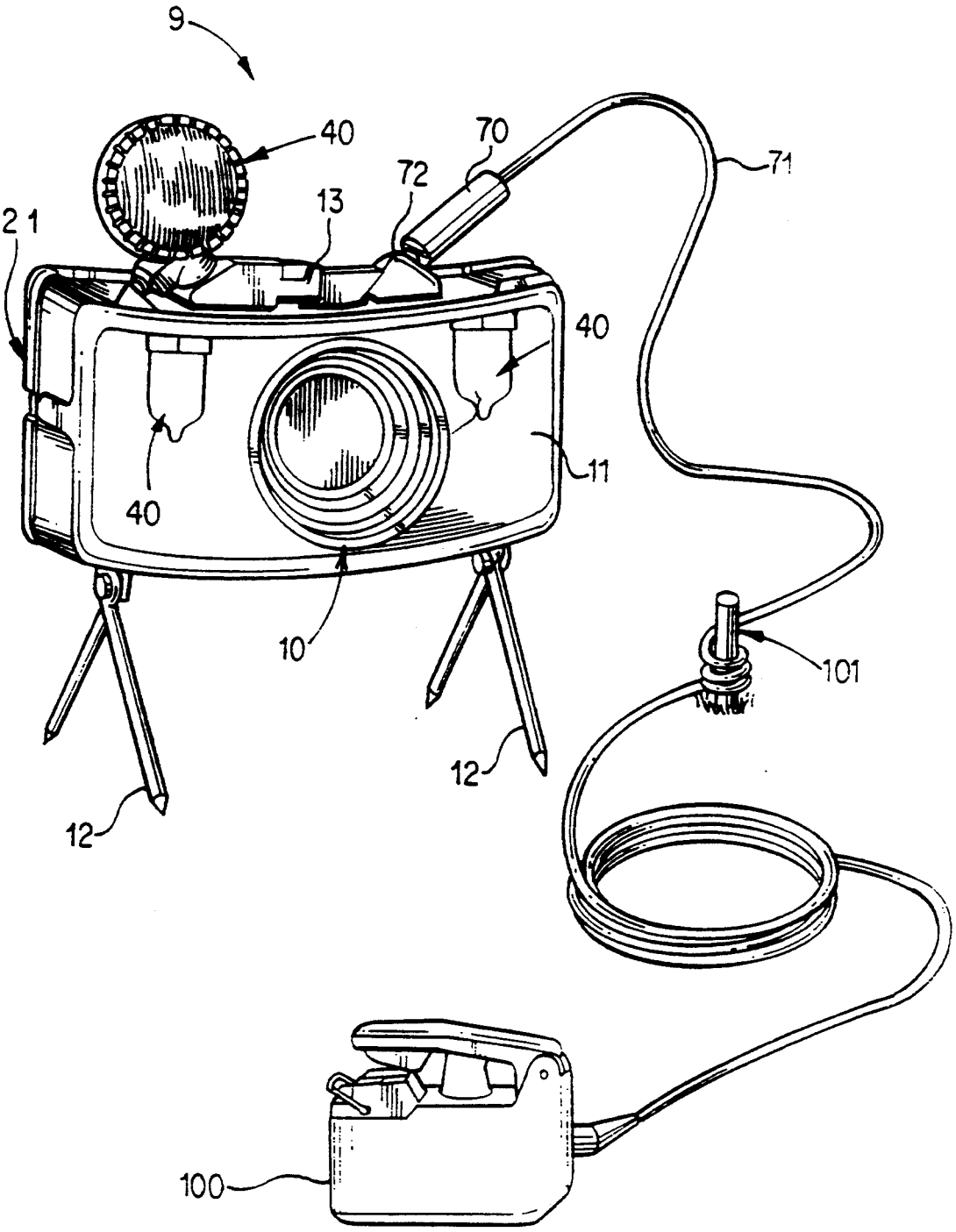
FIG. 1 shows a sketch of the MILES compatible training device and the M57 pulse generator.
Figure 2:
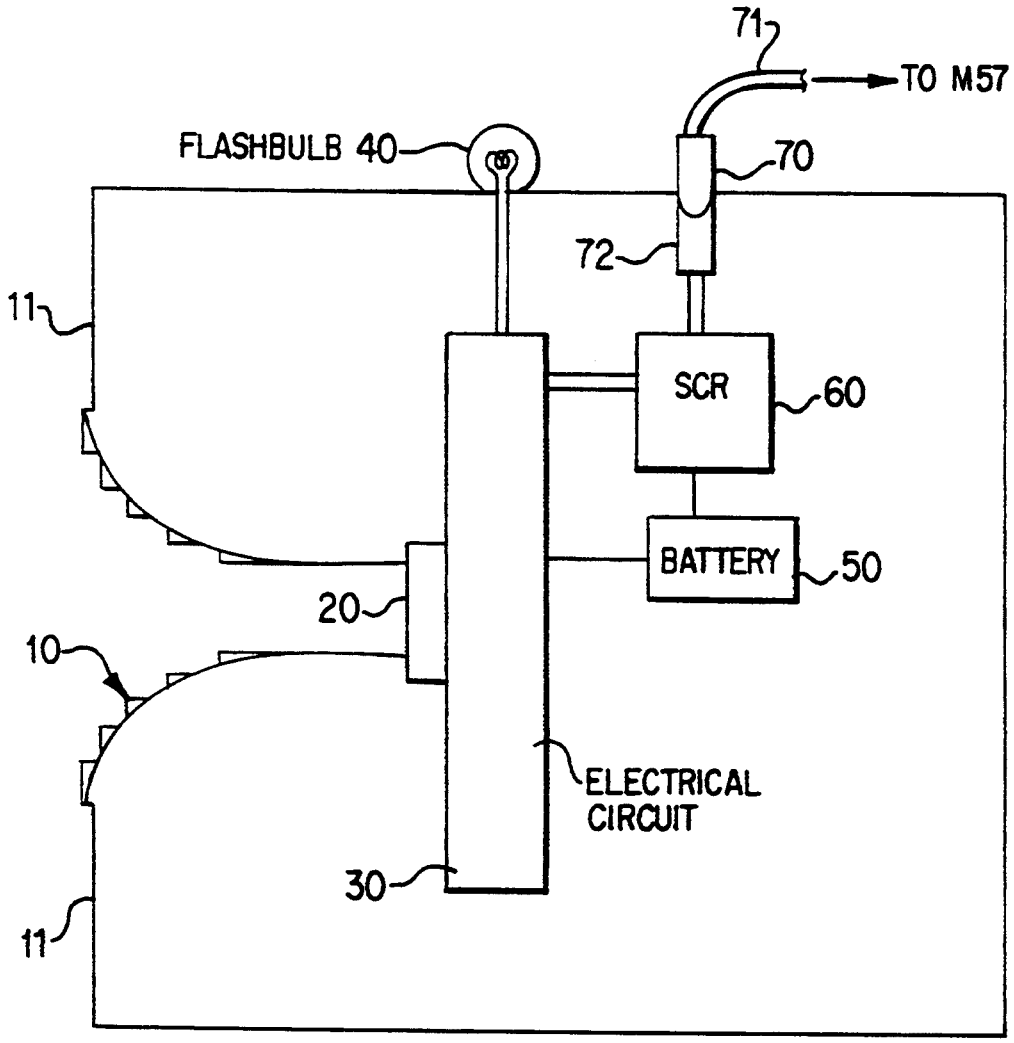
FIG. 2 shows the mechanical configuration of the MILES compatible training device.
Figure 3:
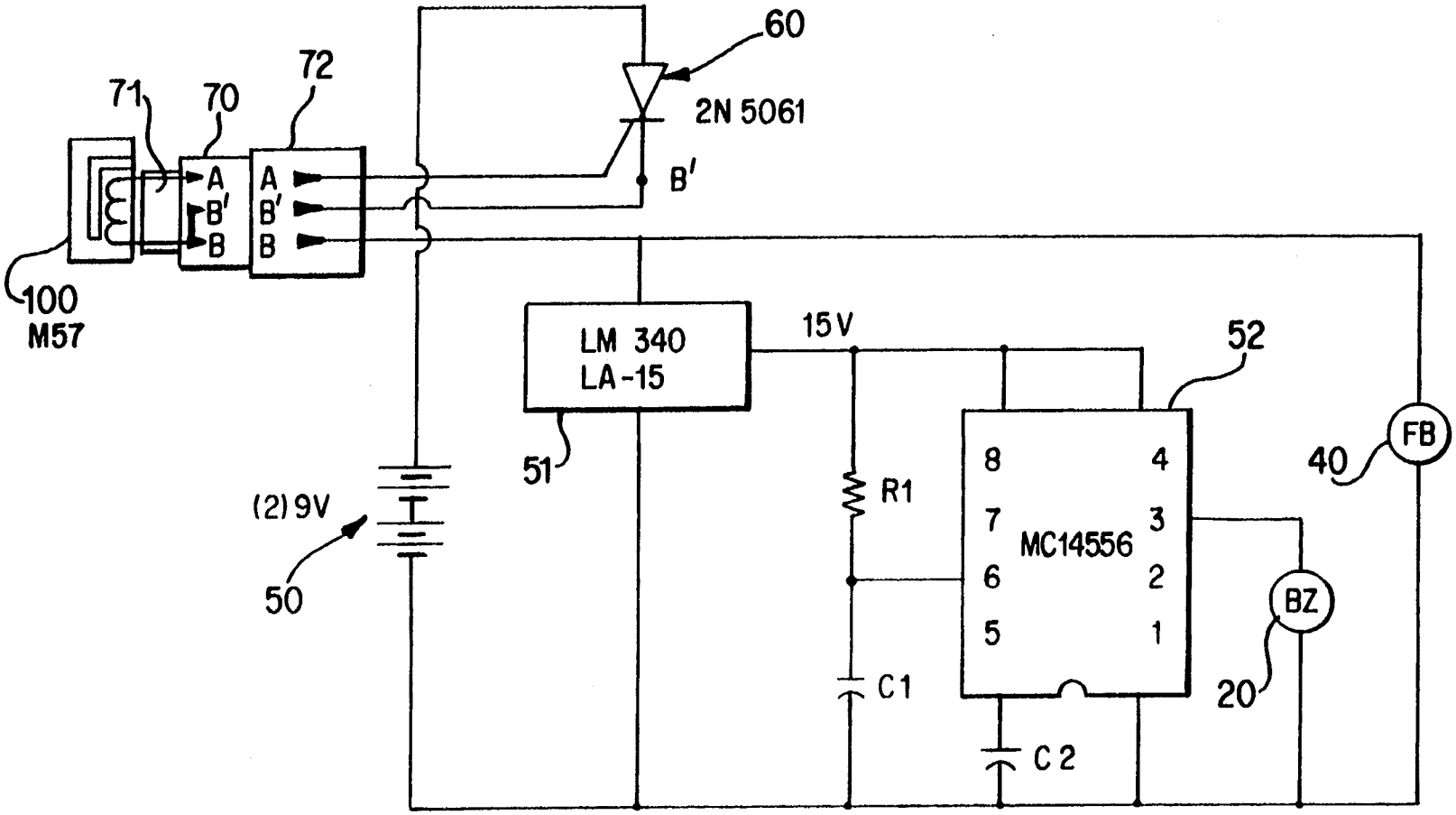
FIG. 3 is an electrical schematic of the MILES compatible CLAYMORE training device (MCCTD).
Figure 4:
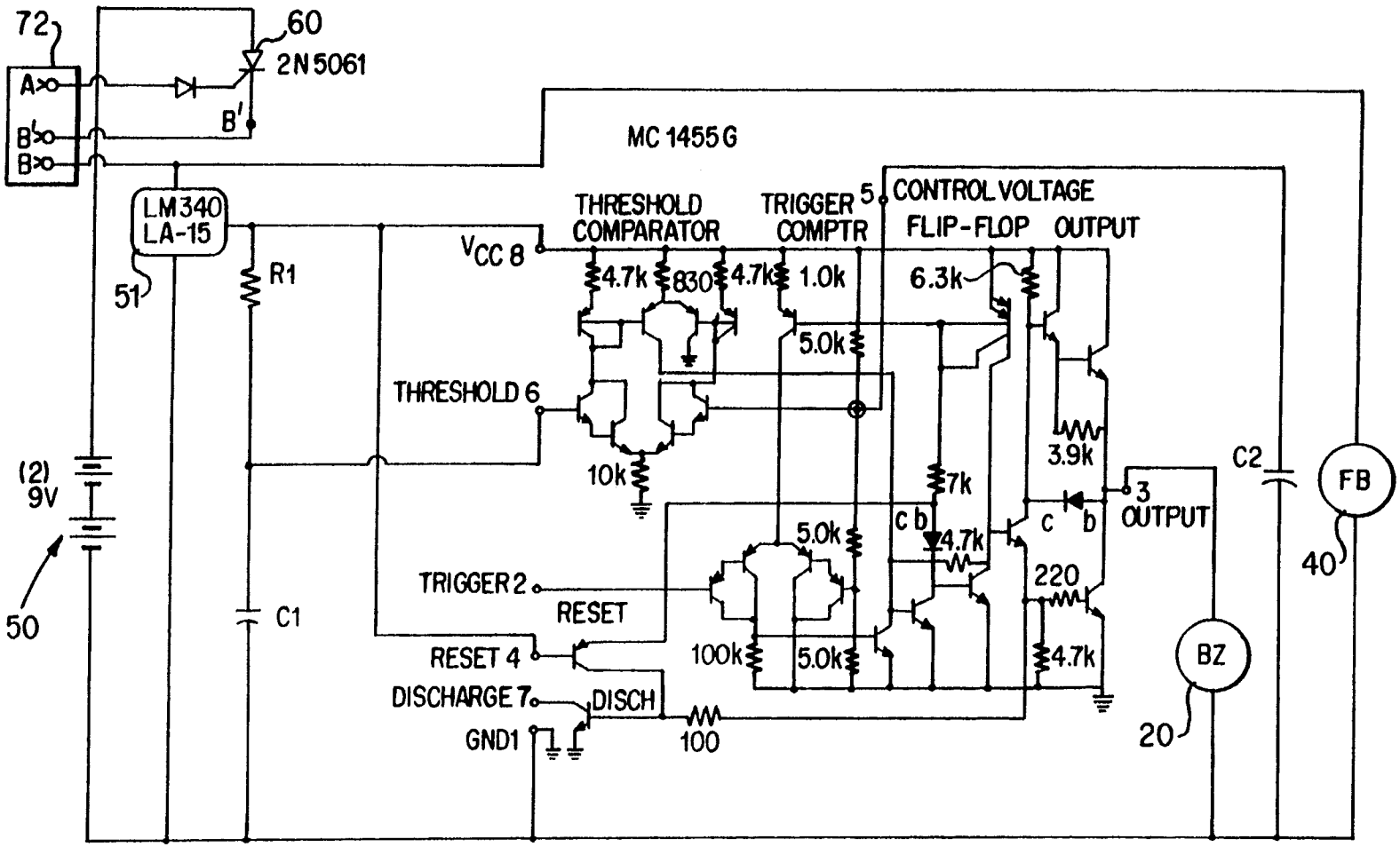
FIG. 4 shows a more detailed schematic of the MCCTD timer.

Referring now to FIGS.1 and 2 it can be seen that a stepped exponential horn 10 is at the center of the front face 11 of the MCCTD or training device 9. The exponential horn 10 is designed to have a radiation cone of about 60 degrees, the same as the 60 degree angle of lethality of the actual Claymore mine. A buzzer 20 is mounted behind the exponential horn 10. The MCCTD utilizes a housing 21 constructed almost exactly like the actual Claymore mine. The housing 21 has a flashlight light or lights 40 attached to said housing 21. Included are scissor type folding support legs 12 and a slit aiming device 13 used to aim and position the MCCTD 9. FIG. 1 also shows the M57 handheld pulse firing generator 100, the firing cable 71, and the firing plug 70 which are used to activate the MCCTD 9. FIG. 2 shows a mechanical block diagram configuration of the MCCTD 9. The components consisting of the buzzer 20, the electrical firing circuit 30, the SCR switch 60, and the battery 50 are positioned within the housing 21 in accordance with good engineering practice. A firing plug receptacle 72 is mounted on the housing 21 to receive the firing plug 70, which are a standard phone type plug and receptacle combination available to those practicing in this art. FIGS. 3 and 4 are electrical schematics of the MCCTD 9. FIG. 4 shows the schematic of a MC 1455G semiconductor timer chip which can be utilized in the MCCTD 9. The operation of the electrical components is standard to one working in this art.

FIG.1 shows a stepped exponential horn 10 used to amplify and radiate the acoustic wave generated by the buzzer 20. The buzzer 20 is mounted behind the horn 10 and on the electrical firing circuit 30. The electrical circuit 30 is powered by a battery 50 which is activated by the M57 pulse generator 100 through a silicon controlled rectifier 60. The output of the electrical circuit 30 triggers the flashlight or flashlights 40. The flashbulbs or bulb 40 can be ordinary flashbulbs or more sophisticated multiple flashbulbs of the xenon, halogen, or other type common in the art, which would require standard engineering modifications in the electrical circuitry. Sources of light other than flashbulbs can be used and can be located inside of the housing 21 as shown in FIG. 1 which housing 21 can be made of a transparent or semi-transparent material. The buzzer 20 is activated at the same time that the flashbulbs or light 40 is activated, and stays on for about 3 seconds. This is sufficient time for the acoustic wave propagated through the directional horn 10 to be detected by a MILES system as described in the application of Campagnuolo and Gerber (Ser. No. 07/691,603).

The cable 71 from the M57 pulse generator 100 is inserted into the receptacle 72 of the MCCTD 9 thereby connecting terminals A to A′, B to B, and B′ to B′. This arms the MCCTD 9. When the handle of the M57 pulse generator 100 is depressed, an electrical pulse is generated and applied to the gate of SCR 60 thereby turning 60 on. This action furnishes a current path from the battery 50 to the flashbulb or bulbs 40, causing 40 to fire. At the same time, power is applied to a 15 volt regulator, LM 340 51, and to timer MC1455G 52, causing buzzer 20 to turn on for about 3 seconds. The on-off buzzer signal which has a frequency of about 3.8 KHZ, is detected by a microphone in the MILES harness (worn by a soldier) thereby signalling that a "HIT" has taken place. This is described fully in the patent application cited above.

Having described this invention, it should be apparent to one skilled in the art that the particular elements of this invention may be changed, without departing from its inventive concept. This invention should not be restricted to its disclosed embodiment but rather should be viewed by the intent and scope of the following claims.

What is claimed is:

1. An inert, non-explosive, Claymore antipersonnel training device for use with a MILES compatible battle training system comprising:

a housing substantially resembling the Claymore series antipersonnel mine, a means for emitting a directional acoustic signal replicating an actual Claymore pattern, a means for emitting a visual signal, a means for activating said training device comprising a handheld pulse generator and a firing cable attached to said housing and to said handheld pulse generator, wherein upon activation of said training device, said directional acoustic signal further activates a MILES compatible system attached to a target within an effective distance of said directional acoustic signal.

2. A training device as in claim 1 wherein said means for emitting a directional acoustic signal comprises a stepped exponential horn having a beamwidth of 60 degrees.

3. A training device as in claim 1 wherein said means for activation of said training device comprises an M57 type handheld pulse generator.

4. A housing as in claim 1 wherein said housing comprises a transparent plastic material.

5. A training device as in claim 1 wherein said means for emitting light comprises at least one source of light within said housing to emit said visual signal.

* * * * *